E. L. CLARK.
BATTERY TESTER.
APPLICATION FILED SEPT. 8, 1914.

1,244,425.

Patented Oct. 23, 1917.

WITNESSES:
H. J. Caldwell.
H. G. Grover

INVENTOR.
EMERSON L. CLARK
BY Ira J. Adams
ATTORNEY

UNITED STATES PATENT OFFICE.

EMERSON L. CLARK, OF LAKEWOOD, OHIO, ASSIGNOR, BY MESNE ASSIGNMENTS, TO NATIONAL CARBON COMPANY, INC., A CORPORATION OF NEW YORK.

BATTERY-TESTER.

1,244,425.

Specification of Letters Patent.

Patented Oct. 23, 1917.

Application filed September 8, 1914. Serial No. 860,570.

*To all whom it may concern:*

Be it known that I, EMERSON L. CLARK, a citizen of the United States, residing at Lakewood, in the county of Cuyahoga and State of Ohio, have invented a certain new and useful Improvement in Battery-Testers, of which the following is a full, clear, and exact description.

This invention relates to a device for testing dry batteries. Before leaving the factory all dry cells are tested for voltage or short-circuit current, or both, prior to shipping. Inasmuch as these batteries are manufactured in large quantities a quick, simple and accurate method is necessary. This invention relates to apparatus for fulfilling the previously mentioned requirements.

The usual method of testing consists in the use of an ordinary electrical instrument for reading the current or voltage. In testing dry cells in large numbers this is a slow method because the operator must observe the top of the dry cell to place the meter leads in contact with the terminals of a battery and then must make the meter reading. This constant looking back and forth between the batteries and the meter is tiresome and entails a considerable waste of time. Furthermore, the accuracy of the test depends upon the accuracy with which the operator observes the meter, and if the reading is observed carefully the time required for testing a truck full of batteries is unduly long. My invention aims to eliminate these difficulties by means of a testing apparatus which gives an audible signal if the battery current or voltage is up to the standard, otherwise no signal is given. The gaze of the operator can thus be continually fixed upon the terminals of the batteries and the testing can therefore be done with despatch.

In the accompanying drawings I have shown two modifications of the apparatus, although it will be obvious that other arrangements embodying the same fundamental features may be readily designed.

Figure 1:
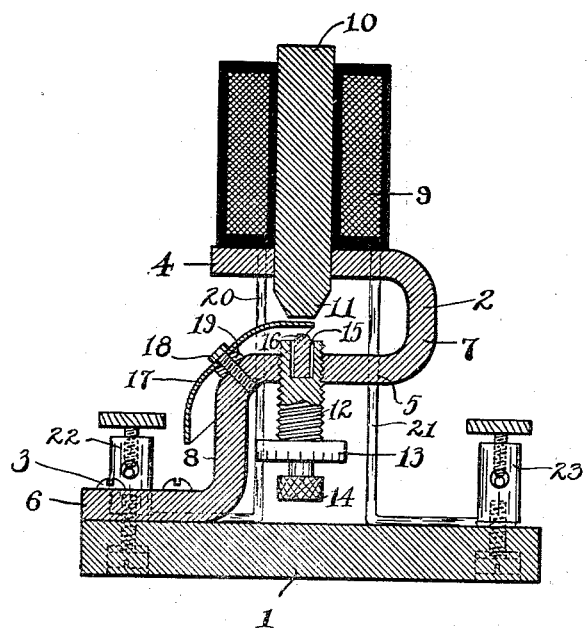
Figure 1 is a central sectional view of a battery tester using a bell as an audible signal.

Referring to Fig. 1 the device consists of a wooden or other insulating base 1 having a bracket 2 preferably made of brass or other non-magnetic metal fastened to the base by suitable means such as screws 3. The bracket may be said to be made up of three horizontal arms 4, 5 and 6 joined by vertical portions 7 and 8. Upon the upper arm 4 of the bracket is mounted a magnet coil 9 having a soft iron core 10 passing through its center and suitably insulated therefrom. One end of the core passes through an opening in the arm 4 of the brass bracket and is pointed at 11 to form one pole of the electro-magnet. In a threaded opening in the middle arm 5 is fitted an adjustable screw 12 of non-magnetic material. Calibrating marks are placed on the surface of a projecting flange 13 of the adjustable screw and a knurl 14 is also conveniently used for varying the position of the screw. An opening or cavity 15 is bored in the center of the adjusting screw directly under the point 11 of the magnet core, and in this cavity 15 I place a small iron armature 16 which will be attracted to the core 10 by the magnetic action produced when current traverses the magnet coil. In the space intervening between the core 11 and the armature 16 is placed the edge of a bell 17 which is fastened to the bracket at the corner between the members 5 and 8. The bell is fastened in a diagonal position to each of these members by means of a screw 18 and washer 19. The leads 20 and 21 of the coil are respectively connected to binding posts 22 and 23 to which will be attached the leads for making contact with the terminals of the battery.

The operation of the apparatus when a source of E. M. F. is applied to the binding posts 22 and 23 is as follows: The current in the coil will magnetize the core 10 in a well known manner and will attract the armature 16 with a force depending upon the current and the distance between the end 11 of the core and the armature. If this current is sufficient the armature will be raised and strike the bell 17 thus indicating to the operator that the current or voltage of the battery is equal to or greater than the pick-up value for which the device has previously been set. To change this value it is only necessary to adjust the position of the screw 12 thereby changing the length of the gap between the armature and core.

Figure 2:
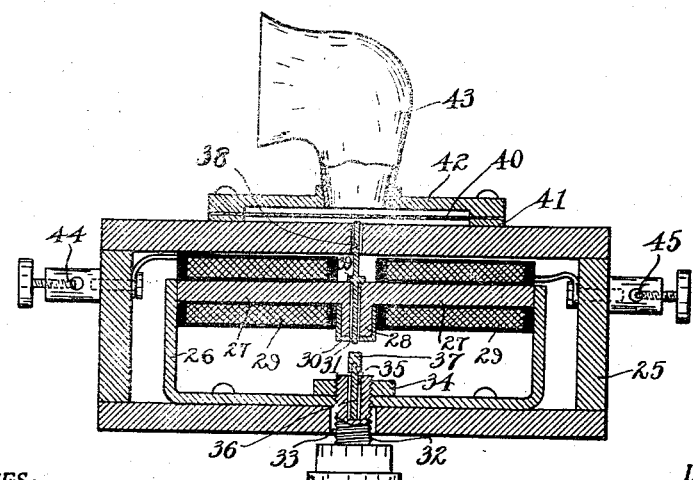
Fig. 2 is a cross sectional view of a preferred modification using a diaphragm.

The preferred form shown in Fig. 2 consists of a rectangular box 25 inclosing the operating parts of the apparatus. A U- shaped frame 26 made of brass supporting a horizonal magnet bar 27 is bolted or otherwise attached to the wooden case. The magnet bar or core 27 has a downwardly projecting lug 28 and on opposite sides of the lug similar magnet coils 29, 29 are placed around the core, suitably insulated from the frame and electrically connected to produce magnetomotive forces in opposite directions. That is, the two coils will both produce a polarity in the lug 28 of the same sign. To prevent the plunger 37 from sticking I place a brass cap 30 over the lug 28. An adjustable screw 32 similar to the screw 12 of Fig. 1 is passed through an opening 33 in the bottom of the case and is threaded through the magnet-supporting frame. A nut 34 may be used to lock the adjusting screw in a given position. The adjusting screw has a cavity 35 in its center in which is fitted a depending pin of an armature 37. The opening is made somewhat deeper than the corresponding opening in Fig. 1 and the area of the pin resting on the bottom of the cavity is considerably smaller. The lower edge of the soft iron armature does not contact with the upper surface of the adjusting screw when the pin, which is made of brass or other non-magnetic material, rests on the bottom of the opening. In an opening 31 in the cap 30 is placed a pin 38 preferably non-magnetic having a collar 39 adapted to rest on the upper surface of the core 27. The lower end of the pin projects a short distance beyond the cap and the upper end projects through an opening in the top of the case. On top of the case is placed a diaphragm 40 spaced there from a short distance by means of a washer 41. A cover 42 having a horn 43 in a central opening is bolted on top of the case. The coils are connected to binding posts 44, 45 to which leads will be attached for contacting with the battery.

When a battery E. M. F. is applied to the terminals, current passes through the coils and the M. M. F. induced thereby produces a pole at the lug 28. The armature is attracted thereto in a well known manner and the impulse is transmitted to the pin 38 which in turn is thrown up against the diaphragm producing a loud signal. The sound emitted from the horn by striking the diaphragm may be varied in any manner desired by changing the nature and construction of the diaphragm. To prevent the pin from being held against the diaphragm I make the distance between it and the top of the pin slightly greater than the distance between the bottom of the cap and the bottom of the pin when in the position shown in the drawing. By so doing, when the armature is lifted into contact with the cap the pin after sounding the signal will fall back against the armature instead of being maintained against the diaphragm by the action of the electro-magnet.

The use of a depending brass pin 36 having a small diameter in comparison with the armature 37 is decidedly advantageous, because, when an iron armature, especially when of larger section, contacts with the bottom of the opening a certain number of times, it does not continue to lift for the same value of current. This trouble is probably due to adhesion or magnetic effects caused by the impact of the iron against the brass screw 32, or to a combination of the two, and this may be prevented by use of a brass or non-magnetic pin of small cross section.

The battery tester is adapted for use as an ammeter or voltmeter by properly designing the same in a well known manner. In testing dry batteries, however, it has been found necessary to test only the so called short circuit current, as the voltage is almost always satisfactory if the current is normal.

In testing batteries with either form of instrument, the operator simply places the contacts on the terminals of the batteries and if the armature is lifted an audible signal is produced. This obviates the necessity for watching a meter scale and also prevents guessing on the part of the operator. By the use of the instrument an operator has been enabled to test from two to three times as many batteries as with the old type.

In the arrangement shown in Fig. 1 the armature 16 is usually held against the bell 17 till the leads are removed from the battery terminals which produces a deadened sound. While this arrangement would be more or less satisfactory, it nevertheless would be preferable to use the arrangement of Fig. 2 consisting of the armature with a brass pin 36 striking against a plunger 39 which in turn would strike the bell 17.

Having described my invention what I claim is:—

1. In an electric meter an electro-magnet having a core passing therethrough, a movable armature adapted to be attracted to the core when the electro-magnet is energized by a current of a predetermined value, means for producing an audible signal, projecting into the path of said armature whereby an audible signal is given when the electro-magnet is energized to such an extent as to attract said armature.

2. In an electric meter, an electromagnet having a core passing therethrough, a movable armature adapted to be attracted toward the core when the electromagnet is energized, an adjustable support for said armature, and means for producing an audible signal projecting between said armature and core whereby said audible signal is given when the electromagnet is energized sufficiently to attract the armature.

3. In an electric meter, an electro-magnet having a core, a sound emitting member adjacent thereto, an armature adapted to be moved toward the core by the flux produced by a predetermined current in said electromagnet, and a hammer adapted to be moved by the armature into engagement with the sound emitting member.

4. In an electric meter, an electro-magnet, an iron armature adapted to be attracted thereby, a shank connected to the armature, a non-magnetic member having a cavity to receive said shank, and a device for producing a sound when the electromagnet is energized sufficiently to attract the armature.

5. In an electric meter, an electro-magnet, an armature of magnetic material having a reduced shank of non-magnetic material, a support for said shank, a diaphragm capable of emitting sound when struck, and a movable hammer adapted to be struck by said armature when it is attracted by the magnet to transmit the blow to the diaphragm.

6. In an electric meter, an electro-magnet having an iron pole piece, a non-magnetic member secured to the pole piece, a hammer loosely passing through said pole piece and having a flange resting thereon, an armature located adjacent the hammer, and a sound emitting device adapted to be struck by said hammer.

7. In an electric meter, an electromagnet having an iron pole piece, a non-magnetic member secured to the pole piece, a hammer loosely passing through the pole piece and having a flange resting thereon, an armature located adjacent the hammer having a non-magnetic shank, a support and guide for the shank and a sound emitting device adapted to be struck by the hammer.

8. In an electric meter, a U-shaped bar, a core of magnetic material joining the ends of the bar, said core having a pole piece in its middle, a non-magnetic cap on the pole piece, a hammer loosely extending through the cap and pole piece, a non-magnetic member extending through said bar, an armature resting in the member and means for magnetizing said bar.

In testimony whereof, I hereunto affix my signature.

EMERSON L. CLARK.

Witnesses:
S. H. FLEMING,
H. G. GROVER.